US008438555B1

(12) United States Patent
Bodine et al.

(10) Patent No.: US 8,438,555 B1
(45) Date of Patent: May 7, 2013

(54) METHOD OF USING AN ENCAPSULATED DATA SIGNATURE FOR VIRTUALIZATION LAYER ACTIVATION

(75) Inventors: Bill Guy Bodine, Oren, UT (US); Paul MacKay, Provo, UT (US); Karl Bunnell, Highland, UT (US)

(73) Assignee: Symantec Corporation, Mountain View, CA (US)

( * ) Notice: Subject to any disclaimer, the term of this patent is extended or adjusted under 35 U.S.C. 154(b) by 873 days.

(21) Appl. No.: 12/551,196

(22) Filed: Aug. 31, 2009

(51) Int. Cl.
*G06F 9/44* (2006.01)

(52) U.S. Cl.
USPC .......................................................... 717/167

(58) Field of Classification Search .................. 717/139, 717/167; 726/22; 707/781; 718/1; 713/156, 713/191; 709/219, 223, 227, 249
See application file for complete search history.

(56) References Cited

U.S. PATENT DOCUMENTS

| | | | |
|---|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |

(Continued)

FOREIGN PATENT DOCUMENTS

| | | |
|---|---|---|
| WO | WO97/00475 | 1/1997 |
| WO | WO97/46955 | 12/1997 |
| WO | WO98/11723 | 3/1998 |

OTHER PUBLICATIONS

Yang Yu, et al: "A Feather-weight Virtual Machine for Windows Applications"; Jun. 14, 2006; pp. 24-34.

(Continued)

*Primary Examiner* — Tuan A Vu
(74) *Attorney, Agent, or Firm* — Roy D. Rankin; Meyertons, Hood, Kivlin, Kowert & Goetzel, P.C.

(57) ABSTRACT

A system and method for opening a file in a virtualization workspace of a host computer system. The host computer system includes a virtualization workspace including a virtualization agent and virtual software layers. The virtualization agent detects a request to open a file in the virtualization workspace. In response to detecting the request, the virtualization agent determines that the file includes embedded metadata. The virtualization agent uses the embedded metadata to identify a virtual software layer in which to open the file, activates the virtual software layer, and opens the file using an application that is included in the identified virtual software layer. The virtual software layer includes one or more applications and the embedded metadata includes a signature corresponding to one of the applications with which to open the file. The identified virtual software layer is installed on the host computer system subsequent to being identified.

20 Claims, 8 Drawing Sheets

U.S. PATENT DOCUMENTS

| | | | |
|---|---|---|---|
| 6,003,087 | A | 12/1999 | Housel, III et al. |
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 7,127,526 | B1 * | 10/2006 | Duncan et al. ............... 709/249 |
| 7,640,332 | B2 * | 12/2009 | Dahiya ......................... 709/223 |
| 7,735,057 | B2 | 6/2010 | Rachman et al. |
| 2004/0230971 | A1 | 11/2004 | Rachman et al. |
| 2006/0047974 | A1 * | 3/2006 | Alpern et al. ................ 713/191 |
| 2007/0294676 | A1 * | 12/2007 | Mellor et al. ................. 717/139 |
| 2008/0010630 | A1 | 1/2008 | Ou-Yang et al. |

OTHER PUBLICATIONS

Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java!", New Riders Publishing, Dec. 1995, pp. 214-216.
Chen, Z. et al., (Dec. Nov. 14, 1995) "Real time video and audio in the world wide web" World Wide Web Journal, Fourth International World Wide Web Conference, pp. 333-348,.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through a Company", internet website www.byte.com BYTE Magazine, Feb. 1998, 5pgs.
V. Hoff et al., "The Open Software Description Format (OSD)", internet website www.w3.org, Aug. 11, 1997, pp. 1-13.
Red Brick Vista, "Aggregate Computation and Management", internet website www. informix.com, printed Oct. 4, 2000.
Fireclick, "Web Site Performance is Key to E-Commerce Sucess", internet website WWW. Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http://216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and wedsite www.marimba. com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei Aug. 6878.
"XMP, Adding Intelligence to Media, XMP Specification Part 3, Storage Files"; Adobe Systems Incorporated, 2008, pp. 1-86.

* cited by examiner

METHOD OF USING AN ENCAPSULATED DATA SIGNATURE FOR VIRTUALIZATION LAYER ACTIVATION

BACKGROUND OF THE INVENTION

1. Field of the Invention

This invention relates to opening files in a computer system. More particularly, the invention relates to a system and method for opening files using applications in a virtualized environment.

2. Description of the Related Art

Computer system users may receive data files through a variety of media, such as via email, downloaded from the Internet, of from removable storage media, etc. In order to view a data file, the user's operating environment (operating system, internet browser, etc.) must first identify an application that is capable of understanding the data file and/or recognizes the data file's type. Files in computer systems generally have an associated file extension that may be further associated with an application to be used to open the file. For example, when a common user action such as a double-click is performed on a file, the file's extension may be used to identify a previously associated application to be launched and then used to open the file. Unfortunately, it is often the case that a file's extension is not associated with an application in the user's operating environment. If a file's extension is not associated with an application, a user may be prompted to select or browse for an application to be used to open the file. Browsing for, downloading, and installing an application may be tedious tasks requiring a level of technical understanding that is uncommon among computer system users.

In a virtualization environment, finding an application with which to open a data file may be further complicated. An application may be virtualized in a virtual software layer so that it may be installed on demand. Application associations are not generally available for applications that are not locally installed. Consequently, conventional browsing for an application may not lead to discovery of a suitable virtual software layer.

In addition to the above considerations, the use of file extensions to identify an application may present other problems to a user. Since file extensions may be easily changed, intentionally or erroneously, a file's extension may not be a reliable indicator of the application that is needed to open the file. In addition, there is generally nothing to prevent application vendors from using the same file extension for different applications. Also, it is possible for files to not have a file extension. Accordingly, what is needed are systems and methods of identifying an application in a virtual software layer to be used to open a data file that account for these concerns.

SUMMARY OF THE INVENTION

Various embodiments of a system and method for opening a file in a virtualization workspace of a host computer system are contemplated. According to some embodiments, the host computer system may include a virtualization workspace including a virtualization agent and one or more virtual software layers. The virtualization agent detects a request to open a file in the virtualization workspace. In response to detecting the request, the virtualization agent determines that the file includes embedded metadata. The virtualization agent uses the embedded metadata to identify a virtual software layer in which to open the file, activates the virtual software layer, and opens the file using an application that is included in the identified virtual software layer.

In one embodiment, the virtual software layer includes one or more applications and the embedded metadata includes a signature corresponding to one of the applications with which to open the file. In a further embodiment, the virtualization agent adds the signature to the file. In a still further embodiment, the identified virtual software layer is installed on the host computer system subsequent to being identified. In a still further embodiment, the virtualization agent receives the identified virtual software layer as a series of streamlets from a streaming server that is separate from the virtualization workspace.

In yet another embodiment, virtualization workspace includes a registry that maps signatures to applications. The virtualization agent uses the signature as a key to query the registry to identify an application with which to open the file. In a still further embodiment, the registry is maintained on a server remote from the virtualization workspace.

Also contemplated is a method of opening a file in a virtualization workspace of a host computer system. The virtualization workspace includes a virtualization agent and one or more virtual software layers. The method further includes detecting a request to open a file on the host computer system and in response to detecting the request, determining that the file includes embedded metadata. The method further includes using the embedded metadata to identify a virtual software layer in which to open the file, activating the virtual software layer, and opening the file using an application that is included in the identified virtual software layer.

In a still further embodiment, a computer readable storage medium stores program instructions executable by a computer system to detect a request to open a file in a virtualization workspace on the computer system. The virtualization workspace includes a virtualization agent and one or more virtual software layers. The program instructions are further executable to, in response to detecting the request, determine that the file includes embedded metadata. The program instructions are further executable to use the embedded metadata to identify a virtual software layer in which to open the file, activate the virtual software layer, and open the file using an application that is included in the identified virtual software layer.

These and other embodiments will become apparent upon consideration of the following description and accompanying drawings.

Figure 1:
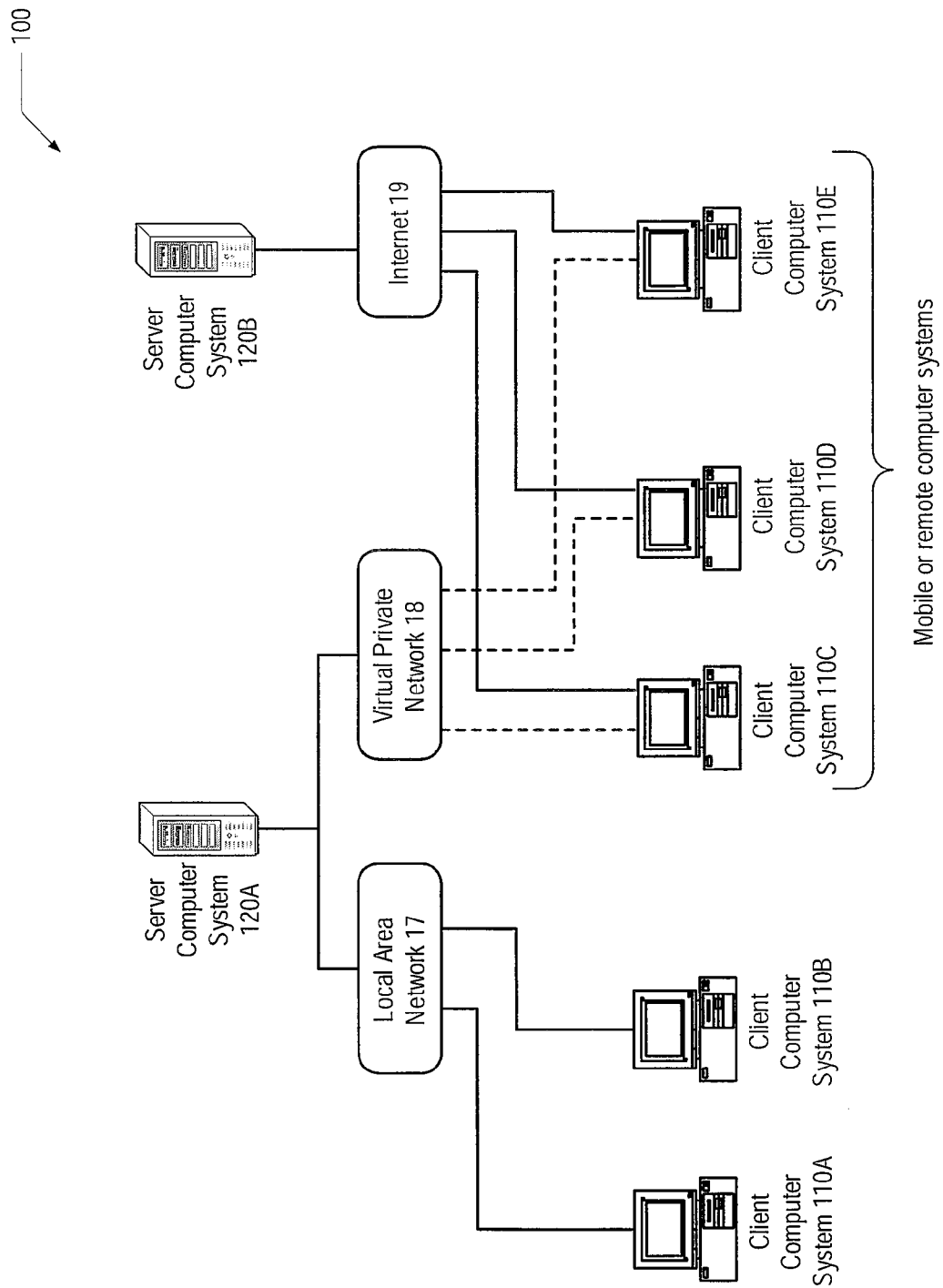
FIG. 1 illustrates one embodiment of a system in which an encapsulated data signature may be used to activate a virtualization layer.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for using an encapsulated data signature to activate a virtualization layer are described herein. Virtualization may be used in client and server computer systems to capture, edit, and make portable the installation of a software application. One or more applications may be captured in a particular type of virtualization layer that may be referred to as a virtual software layer. A virtual software layer, as used herein, refers to a set of data and files that includes all of the installed files and registry settings of one or more applications. Virtual software layers may be managed through a variety of operations including activating, deactivating, editing, deleting, exporting, and importing. A virtual software layer may be said to be activated when a virtualization agent determines that the files and registry settings that are needed by the applications that are included in the layer have been installed and in response, the agent enables the applications in the layer. Generally speaking, a virtual software layer may be isolated to one degree or another from other virtualization layers including other virtual software layers on the same computer system.

FIG. 1 illustrates one embodiment of such a system 100 in which an encapsulated data signature may be used to activate a virtualization layer. In the embodiment shown, system 100 includes client computer systems 110A-110E and server computer systems 120A and 120B. As used herein, elements referred to by a reference numeral followed by a letter may be collectively referred to by the numeral alone. For example, client computer systems 110A-110E may be collectively referred to as client computer systems 110. Client computer systems 110 and server computer systems 120 may be interconnected through various network elements. For example, client computer systems 110A and 110B are shown coupled to server computer system 120A via a local area network 17, client computer systems 110C, 110D, and 110E are shown coupled to server computer system 120A via a virtual private network 18 and to server computer system 120B via Internet 19. In this embodiment, client computer systems 110C-110E may be mobile and/or remote computer systems. In various embodiments the system may include any number and any type of client computer systems 110 and/or server computer systems 120. Client computer systems 110 are representative of any number of stationary computers and/or mobile computing devices such as laptops, handheld computers, television set top boxes, home media centers, telephones, etc. Client computer systems 110 and server computer systems 120 may operate as peers in a peer-to-peer configuration or as clients and servers in a client/server configuration, or a combination or peer-to-peer and client/server configurations. Each client computer 110 may, for example, be used by a particular user or member of a business or other organization, a home user(s), or otherwise.

In alternative embodiments, the number and type of computer systems and network elements is not limited to those shown in FIG. 1. Almost any number and combination of server, desktop, and mobile computer systems or devices may be interconnected in system 100 via various combinations of modem banks, direct LAN connections, wireless connections, WAN links, etc. Also, at various times, one or more computer systems may operate offline. In addition, during operation, individual computer system connection types may change as mobile users travel from place to place connecting, disconnecting, and reconnecting to system 100. In one embodiment, computer system 100 or a portion thereof may be implemented as part of a cloud computing environment.

During operation, each of the client computer systems 110 and/or server computer systems 120 may obtain, install, and execute one or more software applications in either a physical operating system environment or as virtual software layers. For example, software applications may include e-mail, word processing, spreadsheet, and other office productivity applications, specialized applications for handling graphics, images, audio files, video files, performing numeric calculations and the like. Numerous other software applications are known and are contemplated.

Figure 2:
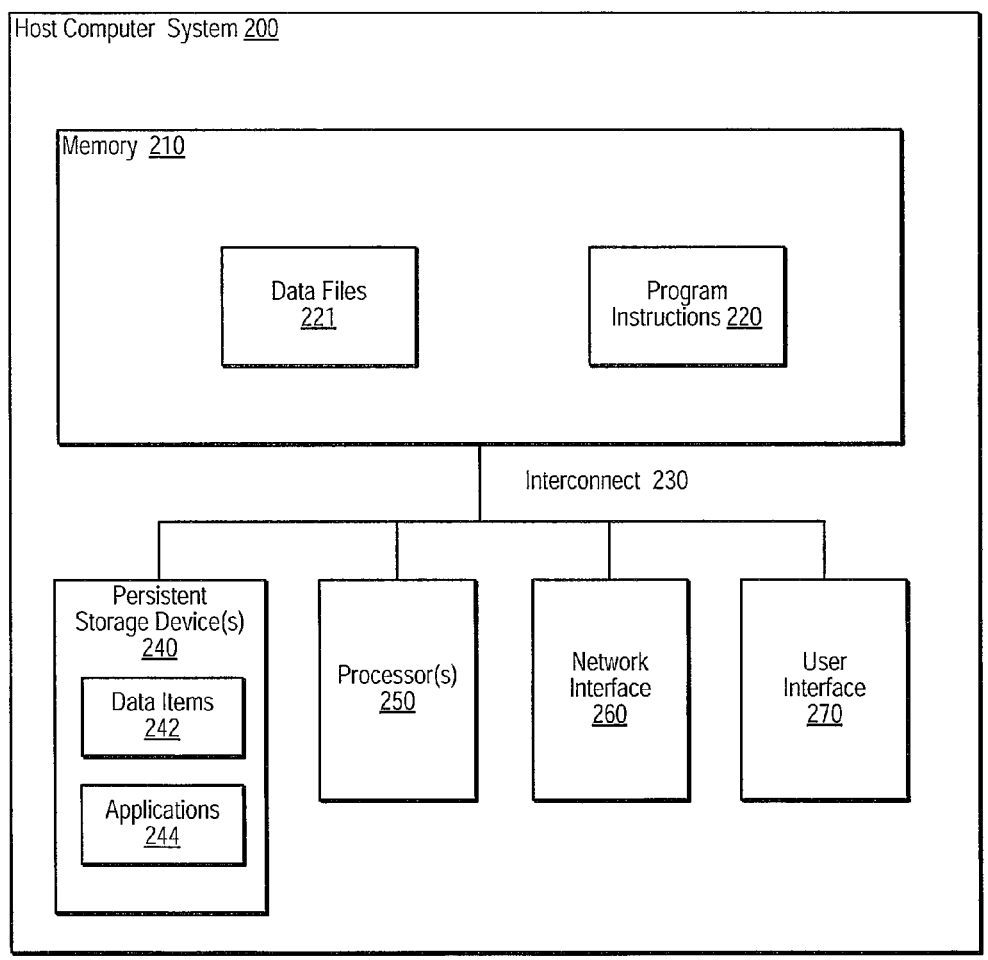
FIG. 2 illustrates one embodiment of a host computer system.

FIG. 2 illustrates one embodiment of a host computer system 200. It is noted that FIG. 2 is provided as an example for purposes of discussion, and in other embodiments the host computer system 200 may take on various other forms. Host computer system 200 may be representative of any of server computer systems 120 or client computer systems 110 described herein. Similarly, host computer system 200 may be used to implement any of the below-described methods. Host computer system 200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Host computer system 200 may include one or more processors 250, each of which may include one or more cores, any of which may be single or multi-threaded. Host computer system 200 may also include one or more persistent storage devices 240 (e.g. optical storage, magnetic storage, hard drive, tape drive, solid state memory, etc), which may include various data items 242 (e.g., files), and/or applications 244. Example applications include databases, email applications, office productivity applications, and a variety of others as known in the art. Host computer system 200 may include one or more memories 210 (e.g., one or more of cache, SRAM, DRAM, RDRAM, EDO RAM, DDR 10 RAM, SDRAM, Rambus RAM, EEPROM, etc.). Host computer system 200 may also include one or more network interfaces 260 for transmitting and receiving data, such as to or from client computer systems 110 or server computer systems 120, as described herein. Host computer system 200 may further include one or more user interfaces 270 for receiving user input or displaying output to users, such as a keyboard, mouse or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

One or more of the system memories 210 may contain program instructions 220. Program instructions 220 may be encoded in platform native binary, any interpreted language such as Java® byte-code, or in any other language such as C/C++, Java®, etc or in any combination thereof. One or more of the system memories 210 may also contain data files 221. Specific program instruction modules and data files that may be included in a system memory of a client computer system and a server computer system are illustrated in FIG. 3 and FIG. 4, respectively.

Figure 3:
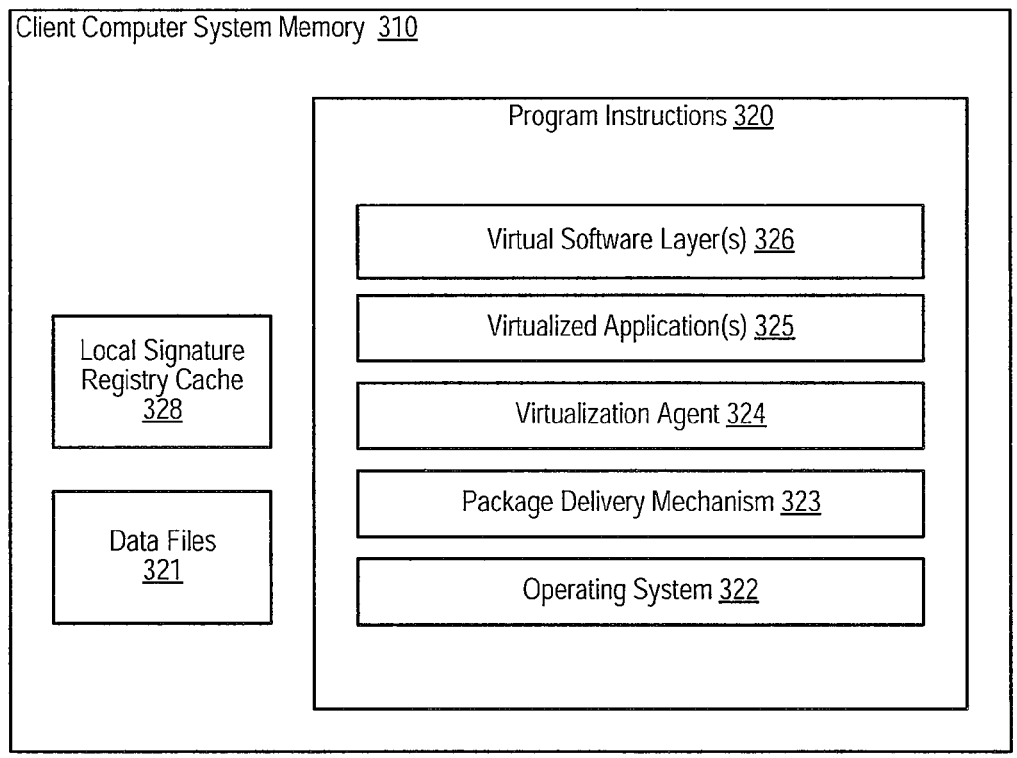
FIG. 3 illustrates one embodiment of a client computer system memory.

FIG. 3 illustrates one embodiment of a client computer system memory 310. As shown, memory 310 may include program instructions 320, data files 321, and a local signature registry cache 328. According to the illustrated embodiment, program instructions 320 may comprise specific modules executable to implement one or more operating systems 322, such as the Windows® operating system, the Solaris® operating system, and/or the Linux® operating system. In addition, program instructions 320 may include modules to implement one or more of a package delivery mechanism 323, a virtualization agent 324, one or more virtualized applications 325, and one or more virtual software layers 326. Operation of these modules will be described in further detail below. Program code included in program instructions 320 can be combined together or separated into various modules as desired, according to a particular embodiment.

Figure 4:
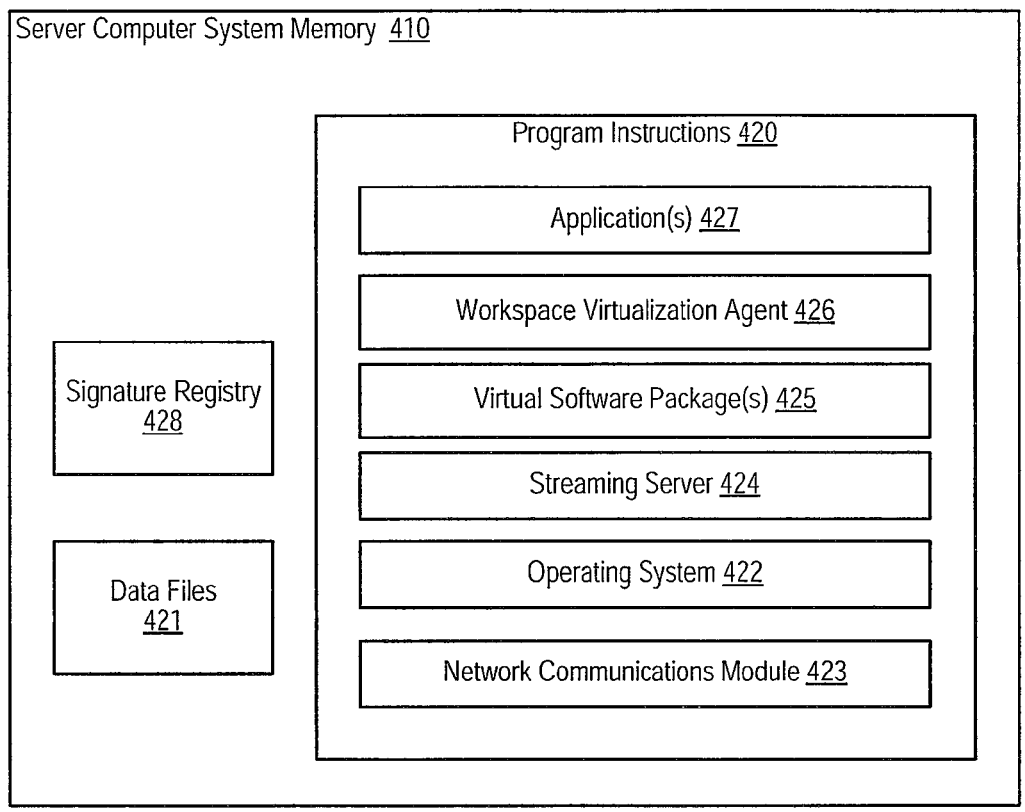
FIG. 4 illustrates one embodiment of a server computer system memory.

FIG. 4 illustrates one embodiment of a server computer system memory 410. As shown, memory 410 may include program instructions 420, data files 421, and a signature registry 428. According to the illustrated embodiment, program instructions 420 may comprise specific modules executable to implement one or more operating systems 422, such as the Windows® operating system, the Solaris® operating system, and/or the Linux® operating system. In addition, program instructions 420 may include modules to implement one or more of a network communications module 423, a streaming server 424, one or more virtual software packages 425, a workspace virtualization agent 426, and one or more applications 427. Operation of these modules will be described in further detail below. Program code included in program instructions 420 can be combined together or separated into various modules as desired, according to a particular embodiment.

During operation of a server computer system 120, a user or administrator may wish to make one or more of applications 427 available to users of client computer systems 110. The user or administrator may use workspace virtualization agent 426 to capture the desired applications 427 as virtual software layers. Virtual software layers may be exported and deployed to client computer systems. In one embodiment, exporting a virtual software layer generates a corresponding virtual software package 425, formatted as a virtual software archive file. Virtual software archive files may be transferred by any of a number of file transfer or download techniques including ftp, etc via network communications module 423. In one embodiment, virtual software archive files may be converted to streamlets and streamed to client computer systems via streaming server 424 and network communications module 423. For each application that is packaged into a virtual software package 425, a unique signature that may be embedded in a data file that can be opened with the application may be generated. Data identifying the signatures and the applications with which they are associated may be stored in signature registry 428.

During operation of a client computer system 110, a user or a process may take an action such as an attempt to open a data file 321, as shown in FIG. 3, that requires use of a particular application, such as one of applications 427, as described in connection with FIG. 4. For example, a user may attempt to open a particular file such as by double-clicking on the file. Virtualization agent 324 may receive an input corresponding to the user action and in response, attempt to identify the particular application. For example, virtualization agent 324 may examine the particular file to find an embedded signature. If an embedded signature is found, virtualization agent 324 may consult local signature registry cache 328 or remotely query signature registry 428 to identify a corresponding application. An entry in registry 328 or 428 may identify a virtualized application 325 that is locally available in a virtual software layer 326 or an application 427 that may be delivered to client computer system 110 in a virtual software package 425 via package delivery mechanism 323 as described further below according to a particular embodiment.

Figure 5:
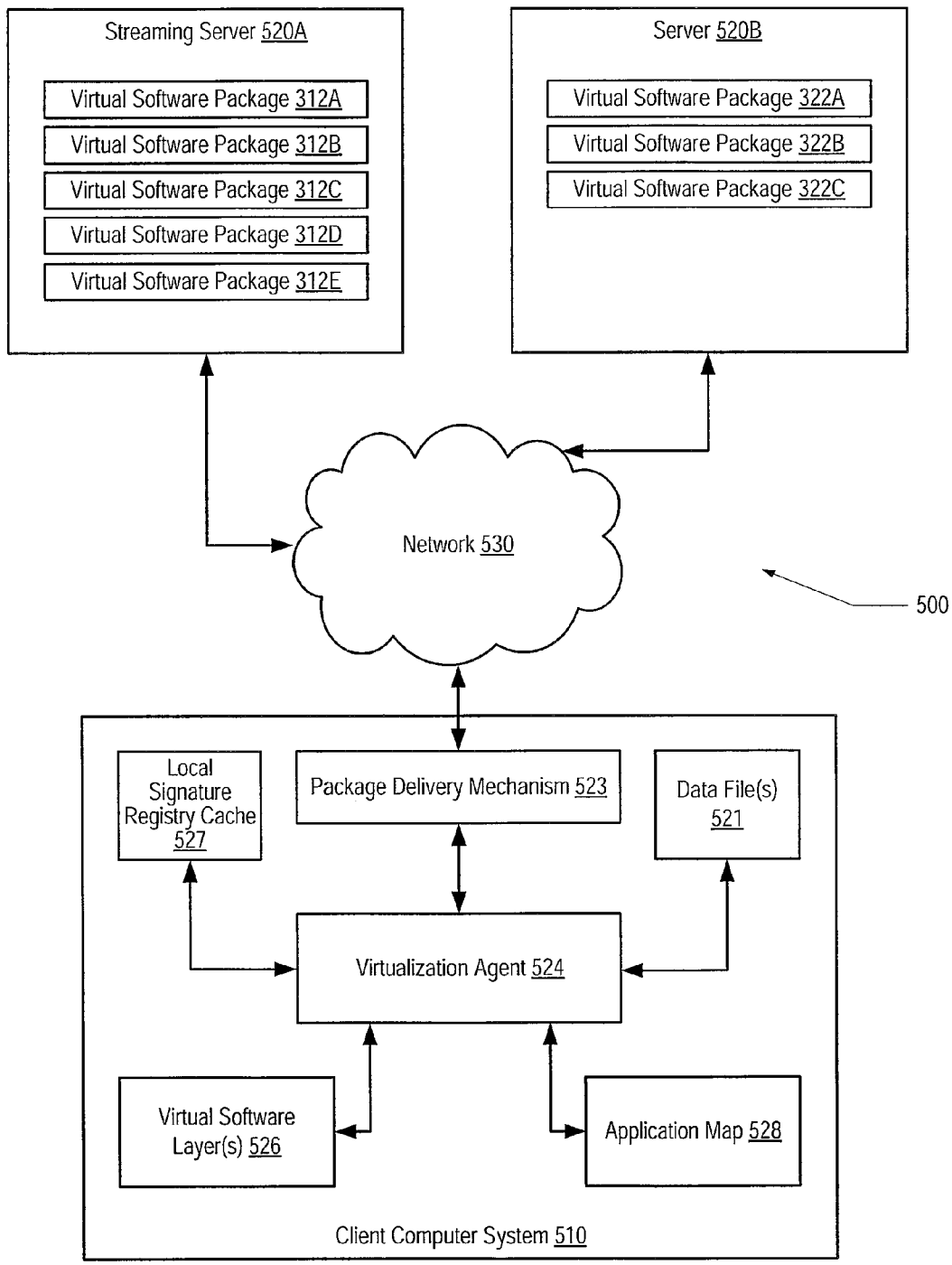
FIG. 5 is a block diagram illustrating one embodiment of a system for locating, importing, and activating virtual software layers with which to open data files.

Turning now to FIG. 5, a block diagram illustrating one embodiment of a system 500 for locating, importing, and activating virtual software layers within which to open data files is shown. In the illustrated embodiment, system 500 includes a client computer system 510, a streaming server 520A, and a server 520B interconnected via a network 530. Streaming server 520A includes virtual software packages 312A-312E and other components (not shown) for communicating with client computer system 510. Server 520B includes virtual software packages 322A-322C and other components (not shown) for communicating with client computer system 510. Streaming server 520A and server 520B may include other virtual software packages in addition to or instead of those shown. Client computer system 510 includes a virtualization agent 524 coupled to a package delivery mechanism 523, a local signature registry cache 527, data files 521, application map 528, and virtual software layers 526.

During operation, virtualization agent 524 may detect a request to open a data file 521 and in response, search the contents of data file 521 for certain types of metadata. For example, metadata may include a recognizable indicator followed by a signature that corresponds to a particular application. Such metadata may be added to data file 521 when the file is created and, for example, the signature may correspond to an application that was used to create the file. Alternatively, the signature may correspond to any desired application for which a valid signature is known that a user desirers to associate with data file 521. Virtualization agent 524 may retrieve the signature from the metadata and use it as a key to search cache 527 for data identifying a corresponding application.

Virtualization agent 524 may maintain a record of applications included in each of virtual software layers 526 in applications map 528. If an application that is included in one of virtual software layers 526 that is located on client computer system 510 is identified, virtualization agent 524 may identify a corresponding layer from application map 528, install the corresponding layer (if the layer is not already installed), activate the identified layer, and direct the request to open data file 521 to the identified application in the identified layer. A virtual software layer may be installed on a host computer system but not activated. In one embodiment, applications within a layer that has not been activated may not be available to perform file operations. If an application that is not included in one of virtual software layers 526 that is located on client computer system 510 is identified, virtualization agent 524 may request a virtual software layer that includes the identified application from a server via package delivery mechanism 523. Streaming server 520A may maintain a record of applications included in each of virtual software packages 312A-312E and server 520B may maintain a record of applications included in each of virtual software packages 322A-322C. If the identified application is included in a layer packaged as one of virtual software packages 312A-312E, package delivery mechanism 523 may permit virtualization agent 524 to import the package via streaming to client computer system 510 from streaming server 520A. Alternatively, if the identified application is included in a layer is packaged as one of virtual software packages 322A-322C, package delivery mechanism 523 may permit virtualization agent 524 to import the layer from server 520B via a file transfer. In an alternative embodiment, virtualization agent 524 may maintain a record of applications included in each of virtual software layers 526 as well as a cache of applications included in each of virtual software packages 312A-312E and applications included in each of virtual software packages 322A-322C in application map 528. In this embodiment, virtualization agent 524 use cached data in application map 528 to determine which of virtual software layers or virtual software packages to activate or import.

A variety of ways of embedding metadata into data files are contemplated. Generally speaking, data files may be natively capable of including various types of metadata. In a given data file format, metadata may be classified as native metadata or custom metadata. Native metadata, as used herein, may refer to metadata for which a mechanism for locating the metadata and interpreting its meaning are both specified by the file format. Custom metadata refers to metadata for which a mechanism for locating the metadata may be compatible with or even specified by the file format but whose interpretation may be determined by a user. Some file formats may not readily allow for the inclusion of custom metadata. Although the methods described herein for identifying applications and corresponding virtual software layers generally apply to file formats that do allow for the inclusion of custom metadata, other file formats may be handled using conventional application identification techniques in conjunction with the methods that are based on custom metadata.

Figure 6:
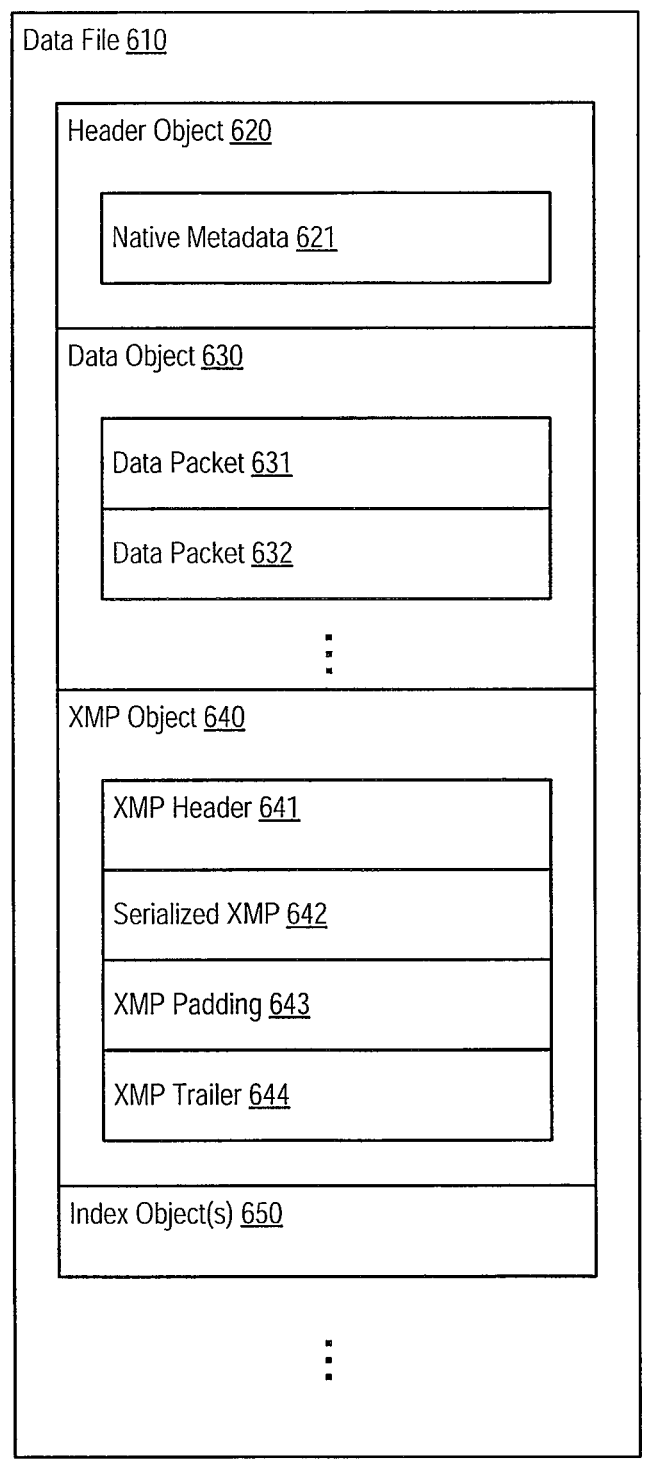
FIG. 6 illustrates one embodiment of a data file that incorporates custom metadata.

FIG. 6 illustrates one embodiment of a data file 610 that incorporates custom metadata. In the illustrated embodiment, a data file 610 is shown that includes metadata according to the Extensible Metadata Platform (XMP) standard for purposes of discussion. Other embodiments may utilize approaches other than, or in addition to, XMP. The XMP standard format is compatible with a wide variety of file formats. In the illustrated embodiment, data file 610 is representative of a file formatted in Advanced Systems Format (ASF), a format commonly used for Windows Media Audio (WMA) or Windows Media Video (WMV) files. Data file 610 includes a header object 620, a data object 630, an XMP object 640, and optionally, one or more index objects 650. Header object 620 may include native metadata 621. Data object 630 may include one or more data packets 631, 632, etc. XPM object 640 includes an XMP header 641, a serialized XMP metadata packet 642, XMP padding 643, and an XMP trailer 644. Custom metadata may be included in XMP metadata packet 642.

Data file 610 may be generated by embedding XMP object 640 after data object 630. XMP header 641, XMP padding 643, and XMP trailer 644 may be referred to as the XMP packet wrapper. In one embodiment, the XMP packet wrapper may be optionally omitted. XMP header 641, if included, may be an XML processing instruction of the form:
<?xpacket begin="" id="W5MOMpCehiHzreSzNTczkc9d"?>

Following the header is serialized XMP metadata 642 that includes an XMP packet of well-formed XML tagged elements. Next is XMP trailer 643, which is recommended to be 2 KB to 4 KB of padding to allow for editing and expanding the XMP packet in place without overwriting other data in data file 610. Trailer 644 may be an XML processing instruction indicating the end of the XMP packet of the form:
<?xpacket end='w'?>

A wide variety of data file formats are compatible with XMP metadata and the exact location of XMP metadata in a file may be dependent on the file format. For example, XMP metadata may be embedded in image files formatted as Digital Negative (DNG), Graphic Interchange Format (GIF89a), Joint Photographic Experts Group (JPEG and JPEG2000), Portable Network Graphic (PNG), and Tagged Image File Format (TIFF). XMP metadata may be embedded in dynamic media files formatted as Advanced Systems Format (ASF, both WMA and WMV), Audio Vide Interleaved (AVI), Flash Video (FLV), QuickTime (MOV), Moving Picture Experts Group (MPEG) files including MPEG-1 Audio Layer 3 (MP3), MPEG-2, and MPEG-4, Flash (SWF), Waveform Audio Format (WAF), and others. XMP metadata may be embedded in certain application file formats, such as Adobe Illustrator (AI) and Adobe Photoshop (PSD). XMP metadata may be embedded in markup formats such as HTML and XML and document formats such as Postscript (PS), Encapsulated Postscript (EPS) and Portable Document Format (PDF), among others.

The following is an example in which XMP metadata is included in an HTML document using the XML element.

<html>
  <head>
    <XML>
    <?xpacket begin="" id="W5MOMpCehiHzreSzNTczkc9d"?>
    <!--The serilazed XMP metadata goes here. It is removed for brevity.-->
    <?xpacket end='w'?>
    </XML>
  </head>
  <body>
  </body>
</html>

If the format of a file includes a marker indicating the location of XMP metadata and the format is known, the XMP packet may be found by scanning the file for the marker. Alternatively, for an unknown file format, a conventional byte-scanning routine may be used to find an XMP header within a file, thereby locating the XMP packet.

Some file formats that are not XMP compatible may also include custom metadata. In such cases, custom metadata may be included which identifies, or in some way indicates, a suitable application for opening a given file. For file formats that do not allow for embedding custom metadata, it may be possible to identify a suitable application with which to open the file from information contained in native metadata. For example, some file formats that include native metadata about suitable applications are Exif, Tiff, GIF87a, and GIF89a. In addition, a file's extension may be considered a form of native metadata that may be associated with a suitable application. However, casual users may easily change file extensions. Consequently, a file extension may be a less reliable indicator of a desired application than other types of metadata. Nevertheless, a robust system for identifying a desired application and corresponding virtual application layer may consider multiple types of metadata including the file extension.

Table 2 illustrates one embodiment of a portion of a signature registry that may be used to map signatures to applications.

TABLE 2

Signature Registry Example

| Signature Type | Signature | Application |
| --- | --- | --- |
| Custom | 131AXG | Word |
| Custom | 162HKE | Acrobat |
| Custom | 233JWM | PowerPoint |
| Native | Excel | Excel |
| Custom | 357AXA | Microsoft Project |
| Custom | 392AHU | Open Office Suite |
| Native | Photoshop | Photoshop |
| Native | Visio | Visio |
| Native | PowerPoint | PowerPoint |
| Native | Illustrator | Illustrator |

It is noted that in the illustrated embodiment, the value of a custom signature may be an arbitrarily chosen string, whereas the value of a native signature may be an encoding of the name of an application. Accordingly, a given application may correspond to both a native metadata string and a custom metadata signature.

During operation, a virtualization agent 524 as described in FIG. 5 may use a local signature registry cache 527 as described in FIG. 5 and/or a signal registry 428 as described in FIG. 4 to identify an application and a corresponding virtual software layer within which to open a file. In one embodiment, virtualization agent 524 may detect a request to open a file and in response, scan the file for custom metadata including a signature. To scan the file, virtualization agent 524 may use a byte-scanning approach that is independent of file format and/or traverse a list of formats, scanning the file for custom metadata located or delimited according to each format in turn, until a signature is found or all listed formats have been tried. If scanning the file for custom metadata yields a signature, virtualization agent 524 may use the signature as a key into signature registry cache 527 or signal registry 428 to identify an application with which to open the file. If scanning the file for custom metadata does not discover a signature, the file may be scanned again for a native signature. To scan the file for a native signature, virtualization agent 524 may traverse a pre-determined set of formats, scanning the file for native metadata located or delimited according to each format in turn until a signature is found or all listed formats have been tried. If scanning the file for native metadata yields a signature, virtualization agent 524 may use the signature as a key into signature registry cache 527 or signal registry 428 to identify an application with which to open the file. If scanning the file for native metadata does not discover a signature, virtualization agent 524 examine the file's extension and determine if an association between the extension and an application exists, such as in a Windows registry. If an association exists, the name of the associated application may be retrieved from the registry. Once an application has been identified, virtualization agent 524 may identify a virtual software layer that includes the identified application from a cached map of application to virtual software layers. In alternative embodiments, the steps described above may be executed in a different order. For example, in one embodiment, virtualization agent 524 may be configured to check a file's extension before scanning the file for a signature. In still another embodiment, virtualization agent 524 may scan the file to find native metadata before attempting to find custom metadata. The order in which these steps are executed may be determined by setting one or more software configurable parameters within virtualization agent 524, during configuration time or at run time.

Figure 7:
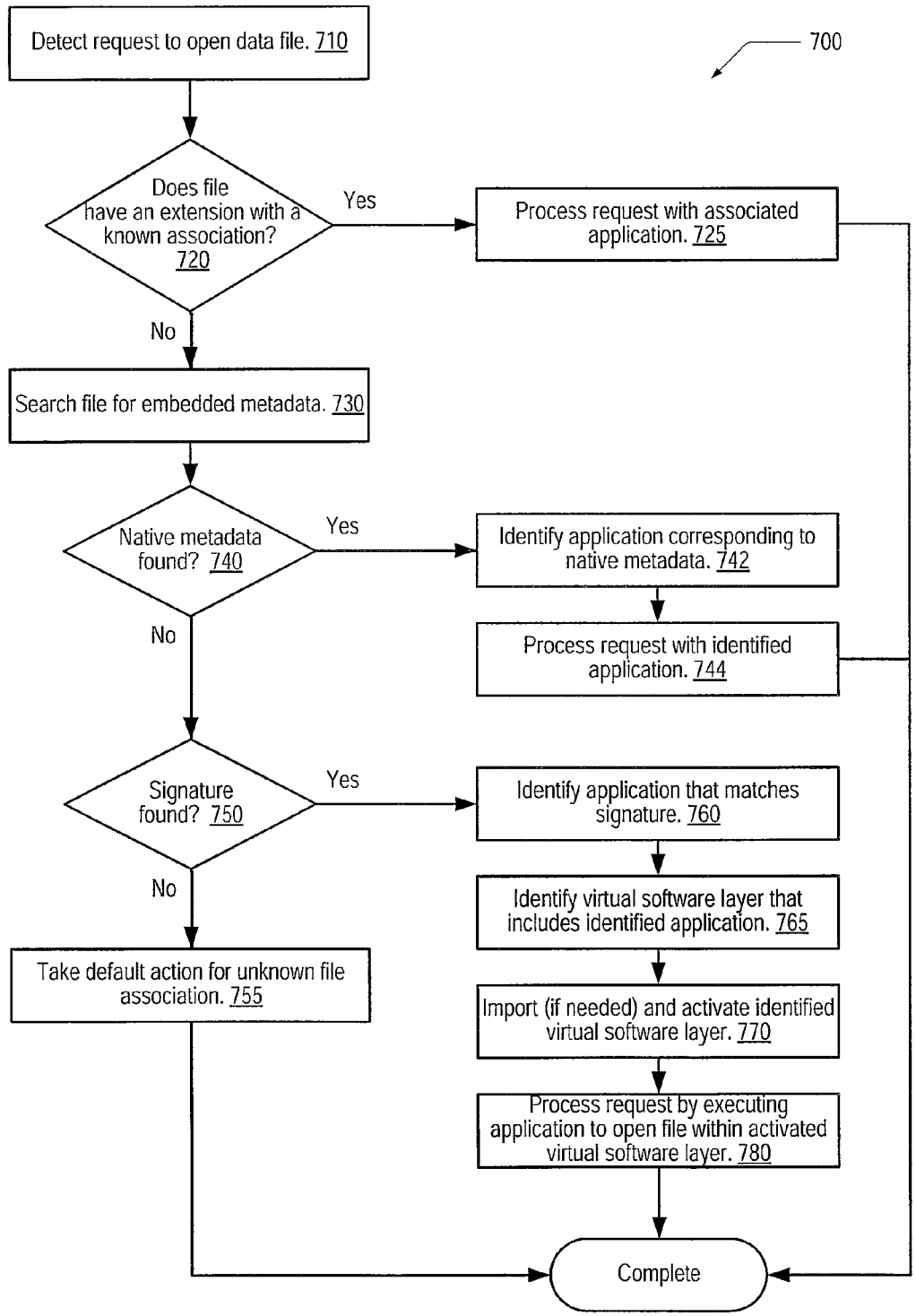
FIG. 7 illustrates one embodiment of a process that may be used to respond to a request to open a data file in a system that uses virtual software layers.

FIG. 7 illustrates one embodiment of a process 700 that may be used to respond to a request to open a data file in a system that uses virtual software layers. Process 700 may begin with detection of a request to open a data file (block 710). In response to receiving the request, the file may be examined to determine if a filename extension exists and if so, if there is a known association between the extension and a locally installed application (decision block 720). If there is a known association with the extension, the request may be processed with the locally installed application (block 725), completing process 700. If there is not a known association with the extension, the file may be searched for embedded metadata (block 730). In response to finding embedded native metadata in the file identifying an application with which to open the file (decision block 740), a virtual software layer that includes the application identified in the native metadata may be identified and activated (block 742). For example, in one embodiment, a locally available virtual software layer that includes the application may be activated or a virtual software layer that includes the application may be streamed or downloaded from a server, imported into a local environment, and activated. In a further embodiment, a mapping of applications to locally available virtual software layers may be maintained in a table. Once a locally available virtual software layer has been activated, the request to open the file may be processed within the activated layer (block 744), completing process 700.

If native metadata identifying an application with which to open the file is not found, but instead, custom metadata including a signature is found (decision block 750), an application that corresponds to the signature to the signature may be identified (block 760), such as by using the signature as a key to query a registry mapping signatures to applications. A virtual software layer that includes the identified application may be identified (block 765), such as by querying a table that includes a mapping of applications to locally available virtual software layers. The identified virtual software layer may then be imported (if it is not available in the local virtualized environment) and activated in the local virtualized environment (block 770). Once the layer is activated, the request to open the file may be processed by executing the identified application within the activated layer (block 780), completing process 700. If neither native metadata nor custom metadata including a signature is found (decision blocks 740 and 750), a default action for files with no known application association may be taken (block 755), completing process 700.

Figure 8:
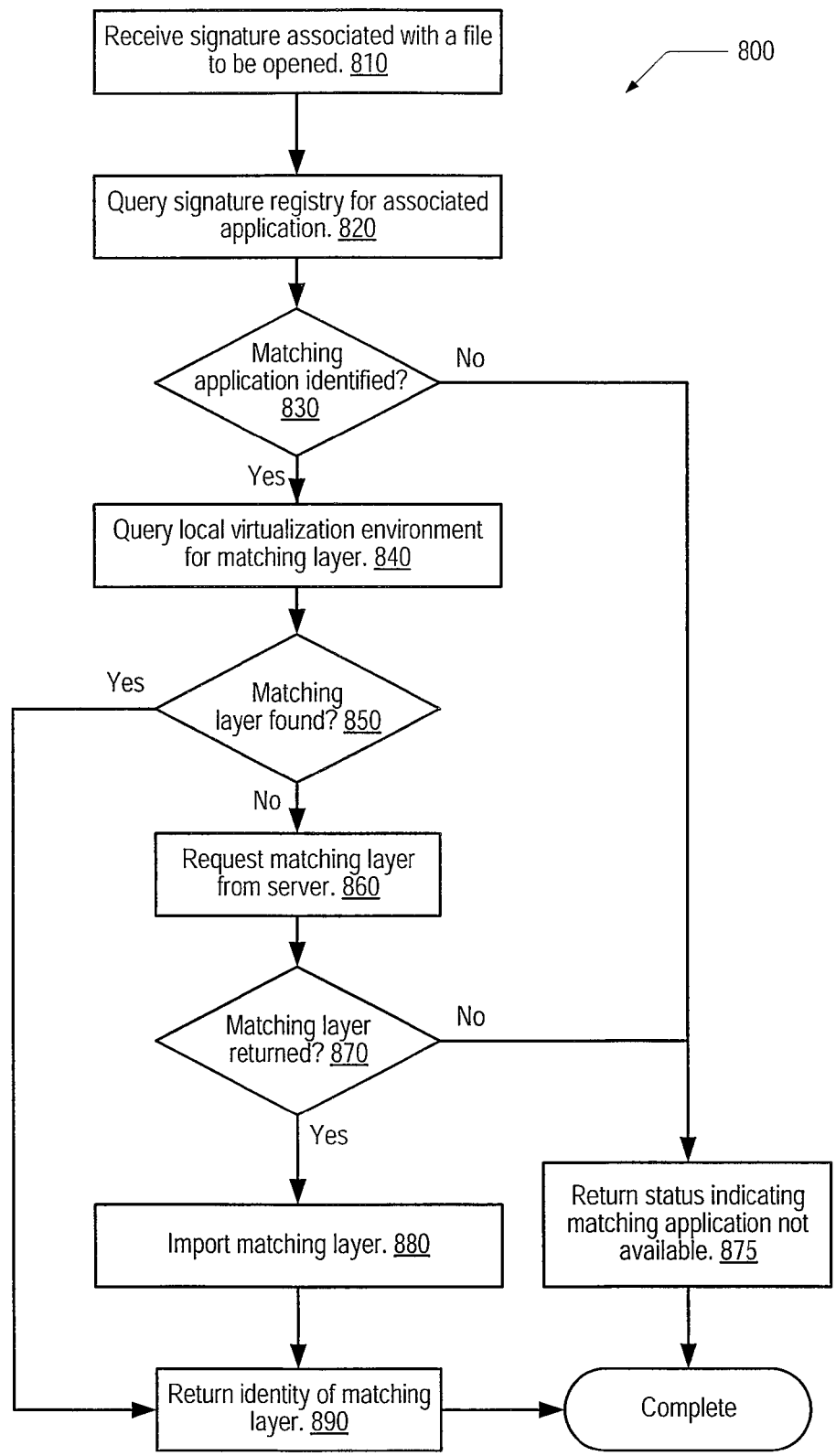
FIG. 8 illustrates one embodiment of a process that may be used to find a virtual software layer that matches a signature embedded in a file.

FIG. 8 illustrates one embodiment of a process 800 that may be used to find a virtual software layer that matches a signature embedded in a file. Process 800 is one example embodiment of block 760 of FIG. 7. Process 800 may begin with receipt of a signature that is associated with a file for which there has been an open request (block 810). The signature may be included in the file as embedded metadata. In response to receiving the signature, a signature registry may be queried using the signature as a key to find an associated application (block 820). If an associated application that matches the signature is not identified in the registry (decision block 830), a status message may be returned indicating that a matching application in not available (block 875), completing process 800. If an associated application that matches the signature is identified in the registry (decision block 830), the local virtualization environment (e.g., the host machine of the file to be opened) may be searched for a layer that includes the matching application, such as by querying a table that includes a mapping of applications to locally available virtual software layers (block 840). If the matching layer is found locally (decision block 850), the identity of the matching layer may be returned (block 890), completing process 800. If a matching layer is not found locally (decision block 850), a request for a matching layer may be conveyed to a server (block 860). For example, a request may be conveyed to a streaming server that is configured to stream virtual software packages to clients or the request may be conveyed to a server configured to download software applications to clients. If a matching layer is not returned (decision block 870), a status message may be returned indicating that a matching virtual software layer in not available (block 875), completing process 800. If the requested matching layer is returned (decision block 870), the matching layer may be imported into the local environment (block 880) and the identity of the matching layer may be returned (block 890), completing process 800.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. It is intended that the following claims be interpreted to embrace all such variations and modifications.

What is claimed is:

1. A computer system including at least a processor coupled to memory storage, the system supporting a virtualized workspace, the system comprising:
    a virtualization workspace including a virtualization agent and one or more virtual software layers, wherein the virtualization workspace comprises a registry that maps signatures to applications;
    wherein the virtualization agent is configured to:
        detect a request to open a file in the virtualization workspace;
        determine whether the file has an extension with a known application association;
        in response to determining there is not a known application associated with said extension, search the file for embedded metadata previously embedded in order to facilitate use of the file within a target application or environment;
        determine that the file to open includes embedded metadata, said metadata including a signature useable to identify a virtualized software layer including a virtualized application configured to open the file inserted by either the virtualization agent or a server;
        in response to determining the embedded metadata is not associated with any locally installed non-virtualized application configured to open the file:
            use the embedded metadata to identify said virtual software layer, wherein the virtual software layer is locally available for use by the virtualization agent, or is retrievable by the virtualization agent via a request to a remote server;
            activate the identified virtual software layer; and
            open the file using the virtualized application that is included in the identified virtual software layer.

2. The system of claim 1, wherein the signature is added to the file by a remote server.

3. The system of claim 1, wherein the signature is added to the file by the virtualization agent.

4. The system of claim 1, wherein the identified virtual software layer is installed on the computer system subsequent to being identified.

5. The system of claim 4, wherein the virtualization agent is further configured to receive the identified virtual software layer as a series of streamlets from a streaming server that is separate from the virtualization workspace.

6. The system of claim 1, wherein the virtualization agent is configured to use the signature as a key to query the registry to identify an application with which to open the file.

7. The system of claim 6, wherein the registry is maintained on a server remote from the virtualization workspace.

8. A method of opening a file in a virtualization workspace of a host computer system including at least a processor coupled to memory storage, the system supporting a virtualized workspace, the method comprising:
    detecting a request to open a file on the host computer system, wherein the virtualization workspace comprises a virtualization agent and one or more virtual software layers, wherein the virtualization workspace comprises a registry that maps signatures to applications;
    determining whether the file has an extension with a known application association;
    in response to determining there is not a known application associated with said extension, searching the file for embedded metadata previously embedded in order to facilitate use of the file within a target application or environment;
    determining that the file to open includes embedded metadata, said metadata including a signature useable to identify a virtualized software layer including a virtualized application configured to open the file inserted by either a local agent or a server;
    in response to determining the embedded metadata is not associated with any locally installed non-virtualized application configured to open the file:
        using the embedded metadata to identify said virtual software layer;
        activating the identified virtual software layer; and
        opening the file using the virtualized application that is included in the identified virtual software layer.

9. The method of claim 8, wherein the signature is added to the file by a remote server.

10. The method of claim 8, wherein the signature is added to the file by the virtualization agent.

11. The method of claim 8, wherein the identified virtual software layer is installed on the computer system subsequent to being identified.

12. The method of claim 11, further comprising receiving the identified virtual software layer as a series of streamlets from a streaming server that is separate from the host computer system.

13. The method of claim 8, further comprising using the signature as a key to query the registry that maps signatures to applications to identify an application with which to open the file.

14. The method of claim 13, wherein the registry is maintained on a server remote from the host computer system.

15. A non-transitory computer readable storage medium, wherein the computer readable storage medium stores program instructions executable by a computer system including at least a processor coupled to memory storage, the system supporting a virtualized workspace to:
   detect a request to open a file in a virtualization workspace on the computer system, wherein the virtualization workspace comprises a virtualization agent and one or more virtual software layers, wherein the virtualization workspace comprises a registry that maps signatures to applications;
   determine whether the file has an extension with a known application association;
   in response to determining there is not a known application associated with said extension, search the file for embedded metadata previously embedded in order to facilitate use of the file within a target application or environment;
   determine that the file to open includes embedded metadata, said metadata including a signature useable to identify a virtualized software layer including a virtualized application configured to open the file inserted by either a local agent or a server;
   in response to determining the embedded metadata is not associated with any locally installed non-virtualized application configured to open the file:
      use the embedded metadata to identify said virtual software layer, wherein the virtual software layer is locally available for use by the virtualization agent, or is retrievable by the virtualization agent via a request to a remote server;
      activate the identified virtual software layer; and
      open the file using the virtualized application that is included in the identified virtual software layer.

16. The non-transitory computer readable storage medium of claim 15, wherein the signature is added to the file by a remote server.

17. The non-transitory computer readable storage medium of claim 15, wherein the signature is added to the file by the virtualization agent.

18. The non-transitory computer readable storage medium of claim 17, wherein the program instructions are further executable by a computer system to use the signature as a key to query a registry that maps signatures to applications to identify an application with which to open the file.

19. The non-transitory computer readable storage medium of claim 15, wherein the identified virtual software layer is installed on the computer system subsequent to being identified.

20. The non-transitory computer readable storage medium of claim 19, wherein the program instructions are further executable by a computer system to receive the identified virtual software layer as a series of streamlets from a streaming server that is separate from the host computer system.

* * * * *